(12) United States Patent
Taylor

(10) Patent No.: US 12,510,750 B2
(45) Date of Patent: Dec. 30, 2025

(54) LINEAR RESONANCE SCANNING APPARATUS AND METHOD OF SCANNING

(71) Applicant: OCCUITY LIMITED, Ledbury (GB)

(72) Inventor: Robin Taylor, Reading (GB)

(73) Assignee: OCCUITY LIMITED, Ledbury (GB)

( * ) Notice: Subject to any disclaimer, the term of this patent is extended or adjusted under 35 U.S.C. 154(b) by 291 days.

(21) Appl. No.: 18/255,672

(22) PCT Filed: Nov. 25, 2021

(86) PCT No.: PCT/EP2021/083047
§ 371 (c)(1),
(2) Date: Jun. 2, 2023

(87) PCT Pub. No.: WO2022/117437
PCT Pub. Date: Jun. 9, 2022

(65) Prior Publication Data
US 2024/0369827 A1 Nov. 7, 2024

(30) Foreign Application Priority Data
Dec. 4, 2020 (GB) ..................................... 2019190

(51) Int. Cl.
*G02B 26/08* (2006.01)
*G02B 26/10* (2006.01)
*H02K 41/03* (2006.01)

(52) U.S. Cl.
CPC ......... *G02B 26/0875* (2013.01); *G02B 26/10* (2013.01); *H02K 41/031* (2013.01)

(58) Field of Classification Search
CPC ... G02B 26/0875; G02B 26/10; H02K 41/031
(Continued)

(56) References Cited

U.S. PATENT DOCUMENTS

2013/0063799 A1   3/2013   Honda et al.

FOREIGN PATENT DOCUMENTS

EP   1081722 A2   3/2001
FR   2031901 A5   11/1970
(Continued)

OTHER PUBLICATIONS

International Search Report for International Application No. PCT/EP2021/083047 dated Mar. 9, 2022.
(Continued)

*Primary Examiner* — William Choi
(74) *Attorney, Agent, or Firm* — Harness, Dickey & Pierce, P.L.C.

(57) ABSTRACT

A linear resonance scanning apparatus (100) comprises an electromagnetic drive unit (132) comprising a coil (140) wound about a core (138), the electromagnetic drive unit (132) having a field output end (134). A linear motion bearing assembly (106) is configured to carry a permanent magnet (130), the linear motion bearing assembly (106) having a longitudinal axis of reciprocating motion. A biasing element (122, 126) is disposed adjacent an end of the linear motion bearing assembly (106) to serve as a buffer for motion along the longitudinal axis of reciprocating motion. The permanent magnet (130) has a surface located opposite the field output end (134) of the electromagnetic drive unit (132) in spaced relation to the field output end (134) of the electromagnetic drive unit (132). The permanent magnet (130) is laterally offset with respect to the core (138) so that the core (138) substantially does not overlie the permanent magnet (130) when at rest.

15 Claims, 5 Drawing Sheets

(58) Field of Classification Search
USPC .......................................................... 359/822
See application file for complete search history.

(56) References Cited

FOREIGN PATENT DOCUMENTS

| GB | 2 467 340 A | 8/2010 | |
|----|-------------|--------|----|
| KR | 20130001746 A | 1/2013 | |
| WO | WO-2017187958 A1 * | 11/2017 | ............. H02K 33/16 |

OTHER PUBLICATIONS

"Dynamic Analysis of Linear Resonant Actuator Driven by DC Motor" (Hirata Laboratory, Department of Adaptive Machine Systems, Graduate School of Engineering, Osaka University, http://www.amp.ams.eng.osaka-u.ac.jp/research/p_sin/rl2008.pdf).

"3-D Finite Element Analysis of Linear Resonant Actuator under PID Control Using Back EMF" (IEEJ Journal of Industry Applications, vol. 1, No. 2, pp. 111-116).

* cited by examiner

LINEAR RESONANCE SCANNING APPARATUS AND METHOD OF SCANNING

CROSS-REFERENCE TO RELATED APPLICATION(S)

This application is the National Phase under 35 U.S.C. § 371 of PCT International Application No. PCT/EP2021/083047, which has an international filing date of Nov. 25, 2021, and which claims priority to Great Britain Application No. 2019190.4, filed Dec. 4, 2020, the entire contents of each of which are incorporated herein by reference.

FIELD

The present invention relates to linear resonance actuator apparatus of the type that, for example, comprises a magnetically actuated reciprocating member. The present invention also relates to a method of actuating, the method being of the type that, for example, magnetically actuates a reciprocating member.

BACKGROUND

In the field of optical systems, it is desirable to be able to scan a lens in a reciprocating fashion at relatively high frequencies, for example frequencies above 200 Hz (when counting bidirectional motion), and over translation ranges greater than 5 mm. It is known to employ piezoelectric based actuators to achieve such high frequencies, but such systems disadvantageously only provide relatively short translation ranges of, for example, less than 1 mm.

Mechanical scanning techniques typically struggle to meet the desired scan rate due to the inherent complexity of the mechanism and the use of a larger moving mass as compared with piezoelectric based actuators. As such, components for mechanical scanning systems need to be mechanically robust owing to the forces and wear that the scanning systems need to withstand. A larger parts count as compared to the piezoelectric based actuators is typical for such systems, which results in the addition of significant cost and complexity to the design of the mechanical scanning system. Additionally, the larger moving mass employed leads to excessive vibration of the system, which is undesirable for some optical systems, for example optical metrology systems.

Linear resonant actuators are known to provide reciprocating motion, for example the Precision Haptic™ range of linear resonant actuator vibration motors available from Precision Microdrives Limited, UK. However, as the name of the product range suggests, these linear resonant actuators are deliberately designed using voice coils to generate vibrations for haptic feedback, which is to be avoided for optical systems. Furthermore, the range of translation of these devices is typically around 200 um and thus inadequate for scanning a lens. Additionally, the scanning is unguided and so particularly unsuitable for scanning a lens.

"3-D Finite Element Analysis of Linear Resonant Actuator under PID Control Using Back EMF" (IEEJ Journal of Industry Applications, Vol. 1, No. 2, pp. 111-116) describes an electromagnet based actuator comprising two so-called "movers" arranged in parallel and formed from two oppositely poled permanent magnets fixed to a back yoke disposed directly above and centred over an electromagnet. The back yoke is flanked on either side by plastic springs. The back yoke reciprocates when driven by an alternating drive signal. A pulse width modulation type control technique is employed to maintain the amplitude of the reciprocating back yoke constant against an external load. However, the implementation described employs a flexure assembly, which has a high stiffness suitable for high frequency scanning in optical systems, but only supports relatively short scan ranges to achieve linearity, i.e. it adheres to an axis of travel over a short range, because over a longer range the flexure assembly describes an arcuate path. Furthermore, as the flexure is formed from a plastics material, it exhibits plastic behaviour and therefore does not control motion adequately owing to the material exhibiting hysteresis. As such, for the larger scan ranges required for some optical scanning applications, the motion is neither linear nor consistently repeatable. The plastic springs employed possess significant variability in their respective spring constants and so do not facilitate maintenance of a stable resonant amplitude and a resonant frequency over the larger translation ranges required. The use of the back yoke increases the moving mass of the system and thus the level of vibration produced by the system. Additionally, the system operates in an open loop manner in respect of position control, which is unsuitable for some optical system applications. Furthermore, owing to the use of a plastic flexure, the dynamics of the system vary with a number of parameters associated with the plastic material and results in difficulty in controlling the frequency or amplitude of oscillations without closed loop control. Also, for some optical system applications, position feedback with respect to the mover would be required. For many position feedback arrangements, it would be necessary to maintain parallelism and linearity of travel of the mover throughout the scan range. However, owing to the use of the flexure assemble, such parallelism and linearity are not possible and so the quality of position feedback information is degraded.

"Dynamic Analysis of Linear Resonant Actuator Driven by DC Motor" (Hirata Laboratory, Department of Adaptive Machine Systems, Graduate School of Engineering, Osaka University, http://www.amp.ams.eng.osaka-u.ac.jp/research/p_sin/rl2008.pdf) describes a circular back iron attached to a drive shaft of a DC motor. The back iron carries a circular permanent magnet arrangement comprising quarter magnet segments of alternating magnetic poles. A reciprocatable shaft is disposed opposite the circular permanent magnet arrangement and is coaxial with the drive shaft of the DC motor. The reciprocatable shaft also comprises a back iron carrying another circular permanent magnet arrangement of the same construction. As the DC motor rotates the drive shaft, the reciprocatable shaft reciprocates as the magnetic poles presented to the permanent magnet arrangement carried by the reciprocatable shaft alternate, thereby translating rotational motion of the DC motor into linear motion of the reciprocatable shaft. However, this kind of linear resonant actuator causes an undesirably high degree of vibration for optical system applications as well as being unable to scan over a sufficiently large distance range. Additionally, precise speed regulation is required for stable operation of the reciprocatable shaft in an optical system, requiring a relatively costly additional hardware overhead. Furthermore, the magnets of the two back irons need to be sufficiently close to excite the drive shaft. However when trying to achieve a longer scan range the magnets have a tendency to lock together owing to the separation between the magnets being uncontrolled and inconsistent. Such locking of the magnets can be overcome by driving the shaft in a so-called "push-only" mode of operation, but this then results in a lower scan range that is asymmetric about a natural neutral position of the magnet of the drive shaft.

SUMMARY

According to a first aspect of the present invention, there is provided a linear resonance scanning apparatus comprising: an electromagnetic drive unit comprising a coil wound about a core, the electromagnetic drive unit having a field output end; and a linear motion bearing assembly configured to carry a permanent magnet, the linear motion bearing assembly having a longitudinal axis of reciprocating motion; and a biasing element disposed adjacent an end of the linear motion bearing assembly to serve as a buffer for motion along the longitudinal axis of reciprocating motion; wherein the permanent magnet has a surface located opposite the field output end of the electromagnetic drive unit in spaced relation to the field output end of the electromagnetic drive unit; and the permanent magnet is laterally offset with respect to the core so that the core substantially does not overlie the permanent magnet when at rest.

The core may have a longitudinal core axis; the linear motion bearing assembly may constrain, when in use, the movement of the permanent magnet in a plane substantially perpendicular to the longitudinal core axis.

The permanent magnet may be located relative to the electromagnetic drive unit so as to be side-coupled with a magnetic field generated, when in use, by the electromagnetic drive unit. The coil may have an inner diameter and an outer diameter. The permanent magnet may have a midpoint; the mid-point may have a neutral position relative to the field output end of the electromagnetic drive unit between the inner diameter and the outer diameter.

The permanent magnet may have an elongate shape. The mid-point may be with respect to the length of the permanent magnet.

The permanent magnet may be mechanically decoupled from the electromagnetic drive unit.

The linear motion bearing assembly may fixedly carry the permanent magnet.

The apparatus may further comprise: another biasing element disposed adjacent another end of the linear motion bearing assembly to cooperate with the biasing element as the buffer for motion along the longitudinal axis of reciprocating motion.

The linear motion bearing assembly in combination with the biasing element may constitute a mass, spring and damper system; the linear motion bearing assembly and/or the biasing element may be configured to define a predetermined resonant frequency.

The electromagnetic drive unit may be configured to generate a fluctuating magnetic field at the field output end thereof, thereby urging the permanent magnet in a linear direction constrained by the linear motion bearing assembly.

The apparatus may further comprise: a driving circuit operably coupled to the electromagnetic drive unit; wherein the driving circuit may be configured to generate, when in use, a cyclic output drive signal.

The driving circuit may be configured to generate a half-wave signal as the cyclic output drive signal. The half-wave signal may comprise positive half-cycles of a cyclic waveform.

The cyclic drive signal may be sinusoidal. The cyclic drive signal may be an alternating signal.

The half-wave signal may comprise negative half-cycles of a cyclic waveform.

The cyclic output drive signal may be a full-wave signal.

The core may be an E-shaped core that may have a central leg and a peripheral core portion; the coil may be wound about the central leg.

The apparatus may further comprise: a linear position encoder unit configured to provide position feedback with respect to the linear motion bearing assembly; and a processing resource operably coupled to the driving circuit and the linear position encoder unit and configured to detect a maximum range of translation drive, and to adjust a frequency of the cyclic output drive signal in response to the position feedback.

The linear motion bearing assembly may be configured to carry an optical element. The optical element may be a lens or lens assembly. The optical element may be a mirror or mirror assembly.

The apparatus may comprise a chassis. A ratio of a mass of the chassis to a mass of the carriage element may be between about 100:1 and 10:1. The ratio of the mass of the chassis to the mass of the carriage element may be between about 40:1 and about 20:1. The ratio of the mass of the chassis to the mass of the carriage element may be 40:1. The ratio of the mass of the chassis to the mass of the carriage element may be 20:1.

According to a second aspect of the present invention, there is provided an optical measurement apparatus comprising the linear resonance actuator apparatus as set forth above in relation to the first aspect of the invention.

The optical measurement apparatus may be a confocal optical measurement apparatus. The optical measurement apparatus may be an interferometric optical measurement apparatus.

According to a third aspect of the present invention, there is provided an optical ocular measurement apparatus comprising the linear resonance scanning apparatus as set forth above in relation to the first aspect of the invention.

The optical ocular measurement apparatus may be a confocal optical measurement apparatus. The optical ocular measurement apparatus may be an interferometric optical measurement apparatus.

According to a fourth aspect of the present invention, there is provided a method of scanning a linear motion bearing assembly comprising a permanent magnet, the method comprising: disposing a field output end of an electromagnetic drive unit opposite the permanent magnet and in spaced relation to the field output end of the electromagnetic drive unit; providing a biasing element adjacent an end of the linear motion bearing assembly to serve as a buffer for motion along a longitudinal axis of the linear motion bearing assembly; arranging the permanent magnet so as to be offset from core of the electromagnetic drive unit when in a state of rest; reciprocating the linear motion bearing assembly by applying an electrically induced fluctuating magnetic field from the field output end of the electromagnet and extending towards the permanent magnet.

According to a fifth aspect of the present invention, there is provided a linear resonance scanning apparatus comprising: an electromagnetic drive unit comprising a rotatable drive shaft; a carriage element rotatably mounted on the electromagnetic drive unit by the rotatable drive shaft, the carriage element being configured to carry a first permanent magnet and a second permanent magnet equidistantly spaced about a periphery of the carriage element; a linear motion bearing assembly configured to carry a third permanent magnet, the linear motion bearing assembly having a longitudinal axis of reciprocating motion; and a biasing element disposed adjacent an end of the linear motion bearing assembly to serve as a buffer for motion along the longitudinal axis of reciprocating motion; wherein the first permanent magnet comprises a first surface and the second permanent magnet comprises a second surface, a first respective pole being produced at the first surface and a second respective pole being produced at the second surface; the first and second surfaces are outwardly facing with respect to the periphery of the carriage element; and the third permanent magnet has a surface located at one side of and opposite the periphery of the carriage element in spaced relation to the carriage element.

The first and second respective poles may be opposite poles.

The carriage element may be circular.

The carriage element may be a wheel having a radius, circumference and a width; the width of the carriage wheel may define an outwardly facing peripheral surface at the periphery of the carriage wheel; and the carriage wheel may be configured to carry the first and second permanent magnets arranged so that the first and second surfaces are substantially parallel with the outwardly facing peripheral surface.

The linear motion bearing assembly fixedly may carry the third permanent magnet.

The linear motion bearing assembly in combination with the biasing element may constitute a mass, spring and damper system; the linear motion bearing assembly and/or the biasing element may be configured to provide a predetermined resonant frequency.

The linear motion bearing assembly may be configured to carry an optical element, for example a lens.

The apparatus may further comprise: an electrical drive circuit operably coupled to the electromagnetic drive unit and configured to generate, when in use, an electrical drive signal; a linear position encoder unit configured to provide position feedback with respect to the linear motion bearing assembly; and a processing resource operably coupled to the electrical driving circuit and the linear position encoder unit and configured to detect a maximum range of translation drive, and to adjust the electrical drive signal in response to the position feedback.

The electromagnetic drive unit may be an electric motor.

The linear motion bearing assembly may be configured to carry an optical element.

The optical element may be a lens or lens assembly. The optical element may be a mirror or mirror assembly.

According to a sixth aspect of the present invention, there is provided an optical measurement apparatus comprising the linear resonance actuator apparatus as set forth above in relation to the fifth aspect of the invention.

According to a seventh aspect of the present invention, there is provided an optical ocular measurement apparatus comprising the linear resonance scanning apparatus as set forth above in relation to the fifth aspect of the invention.

According to an eighth aspect of the present invention, there is provided method of scanning a linear motion bearing assembly comprising a permanent magnet, the method comprising: providing an electromagnetic drive unit comprising a rotatable drive shaft; rotatably mounting a first carriage element on the electromagnetic drive unit by the rotatable drive shaft, the carriage element being configured to carry a first permanent magnet and a second permanent magnet equidistantly spaced about a periphery of the carriage element; providing a linear motion bearing assembly configured to carry a third permanent magnet, the linear motion bearing assembly having a longitudinal axis of reciprocating motion; and providing a biasing element adjacent an end of the linear motion bearing assembly to serve as a buffer for motion along the longitudinal axis of the linear motion bearing assembly; reciprocating a second carriage element of the linear motion bearing assembly by rotating the first carriage element to impart epochs of alternating magnetic force on the third permanent magnet.

It is thus possible to provide an apparatus and method capable of providing accurate control of resonant amplitude and/or frequency of a linearly translating mechanism, for example a linear motion bearing assembly. The apparatus and method support consistent output performance parameters as well as well as a longer range of translation as compared to other solutions. Furthermore, the apparatus and method result in a relatively compact overall assembly, which lends the apparatus well to incorporation in hand-held devices that require linear translation of an element, for example an optical element. Additionally, the compact assembly also offers a significantly lower moving mass when compared to other mass spring damper systems and thus vibration is also reduced significantly, which is particularly desirable for optical scanning applications.

BRIEF DESCRIPTION OF THE DRAWINGS

At least one embodiment of the invention will now be described, by way of example only, with reference to the accompanying drawings, in which.

DETAILED DESCRIPTION OF THE EXAMPLE EMBODIMENTS

Figure 1:
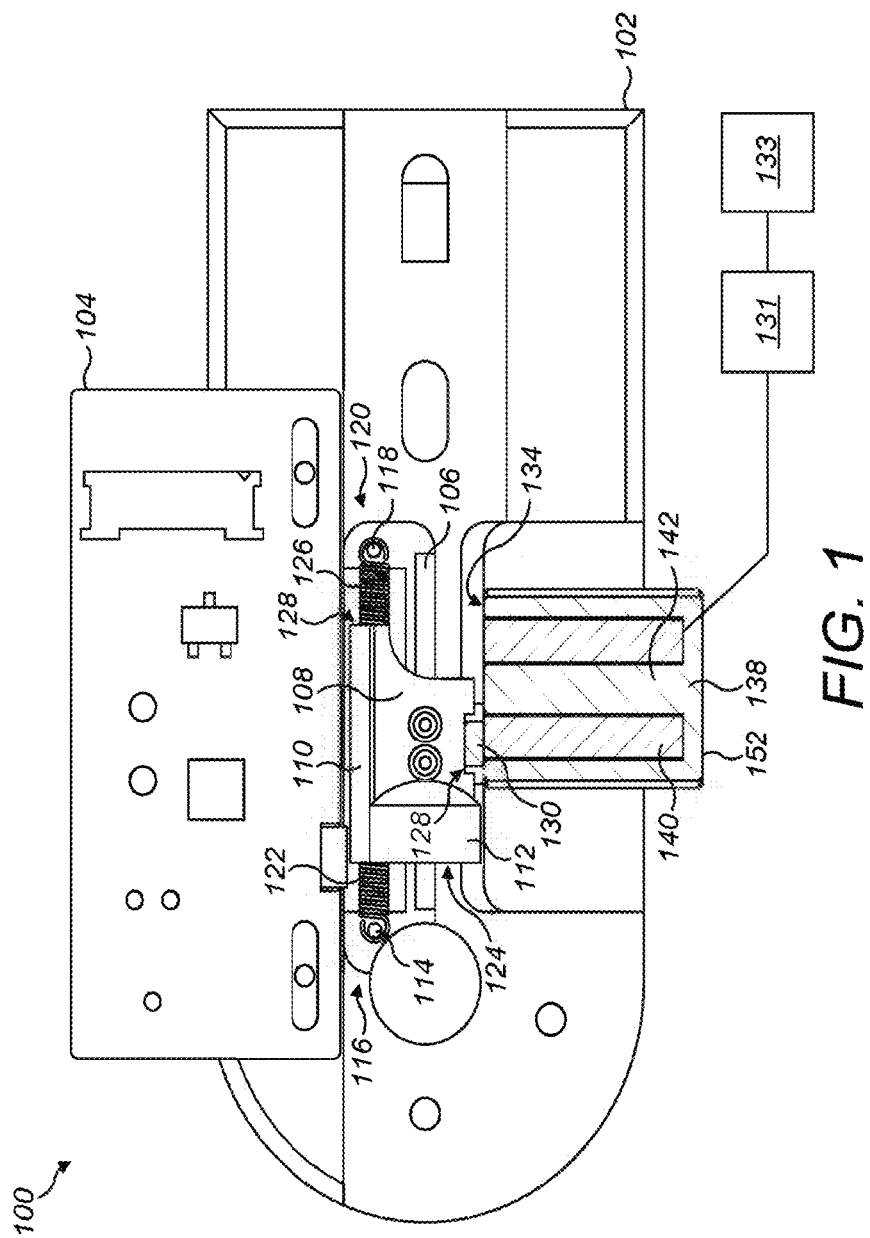
FIG. 1 is schematic diagram in plan view of a linear resonance scanning apparatus constituting an embodiment of the invention.

Throughout the following description identical reference numerals will be used to identify like parts.

Referring to FIG. 1, a linear resonance scanning apparatus 100 is part of an optical measurement apparatus, which can be used for various applications including making confocal measurements, interferometric measurements and pachymetry in relation to a region of a target sample to be measured. Examples of the target sample include, but are not limited to biological tissue, such as a part of an eye. In this regard, the part of the eye can be the cornea, aquas humour or the vitreous humour.

The apparatus 100 is located within a housing (not shown) and comprises a chassis 102 to which a linear encoder 104 is attached to a first side of the chassis 102. A linear motion bearing assembly 106, for example an LWL1 linear motion rolling guide available from Nippon Thompson Co., Ltd., Japan, is mounted on the chassis 102 in a generally central location with respect to the chassis 102, the linear motion bearing assembly 106 carrying, in this example, a translatable carriage 108. In this example, the chassis 102 is formed from a mechanically stiff material, for example aluminium. In this regard, mass can be added to the system, for example the mass of the chassis 102 can be increased, in order to damp unwanted vibrations and improve performance of the system in terms of loss of input energy (efficiency) and the stability of the resonant frequency. These factors facilitate the maintenance of the amplitude of oscillation of the translatable carriage 108 at a desired scan range. For example, the ratio of the mass of the chassis 102 to the mass of the moving mass, for example the translatable carriage 108, can be between about 100:1 and about 10:1, for example between about 40:1 and about 10:1, such as 20:1. In this example, a ratio of about 40:1 is employed. The translatable carriage 108 carries an encoder scale 110, which faces opposite the linear encoder 104. The combination of the linear encoder 104 and the encoder scale 110 is, for example, of the type described in UK patent no. GB 2 467 340, and serves to provide position feedback, when in use, with respect to the translatable carriage 108 of the linear motion bearing assembly 106. The translatable carriage 108 is configured to cooperate with the linear motion bearing assembly 106 to support linear translation of the translatable carriage 108. Furthermore, the translatable carriage 108 is capable of reciprocating or bidirectional travel along a longitudinal axis of reciprocating motion constituting an axis of travel constrained by the linear motion bearing assembly 106. The translatable carriage 108 is configured to carry a lens, for example a scanning lens 112. It should, however, be appreciated that the scanning lens 112 is only one example of an element that can be carried by the translatable carriage 108 and different elements, for example optical elements, such as a mirror or mirror assembly, are contemplated.

The linear motion bearing assembly 106 comprises a first anchoring point 114 at a first end 116 thereof and a second anchoring point 118 at a second end 120 thereof, the first and second ends 116, 120 being at opposite ends, longitudinally, of the linear motion bearing assembly 106. A first buffer, for example a first spring 122, is coupled at one end thereof to the first anchoring point 114 and to a first side 124 of the translatable carriage 108 at another end of the first spring 122. Similarly, a second buffer, for example a second spring 126, is coupled at one end thereof to the second anchoring point 118 and to a second side 128 of the translatable carriage 108 at another end of the second spring 126. Although, in this example, two springs 122, 126 are employed, the skilled person should appreciate that in other examples a single spring can be coupled adjacent an end of the linear motion bearing assembly 106 to one side thereof. It should be appreciated that the spring or springs serve as a buffer that, when in use, causes the translatable carriage 108 to rebound off the spring, or one of the springs depending upon the direction of travel of the translatable carriage 108. In this regard, the first and second springs 122, 126 cooperate to buffer motion along the longitudinal axis of reciprocating motion.

The translatable carriage 108 is configured to carry, in this example fixedly, a permanent magnet 130, for example a neodymium magnet, and so also comprises a recess 128 in which the permanent magnet 130 is located. The recess 128 is located on an opposite side to the side of the translatable carriage 108 carrying the encoder scale 110. The permanent magnet 130 therefore lies substantially in parallel with the encoder scale 110 and moves with the encoder scale 110, when in use. An electromagnet 132, constituting a drive unit, such as an electromagnetic drive unit, is coupled to the chassis 102 at an opposite side to the linear encoder 104, the electromagnet 132 having a field output end 134 disposed opposite the permanent magnet 130, the permanent magnet 130 and the field output end 134 of the electromagnet having an air gap 136 (FIG. 2) therebetween. In this example, the electromagnet 132 comprises a core 138, for example an E-core, formed from a ferrite material, for example soft iron, and a coil 140 wound around a central leg 142 of the core 138. The E-core also comprises a peripheral core portion. The wound coil 140 has an inner diameter and an outer diameter. The core 138, for example the central leg 142 of the core 138, comprises a longitudinal axis constituting a longitudinal core axis. The windings of the coil 140 is between the central leg 142 and the peripheral core portion.

Figure 2:
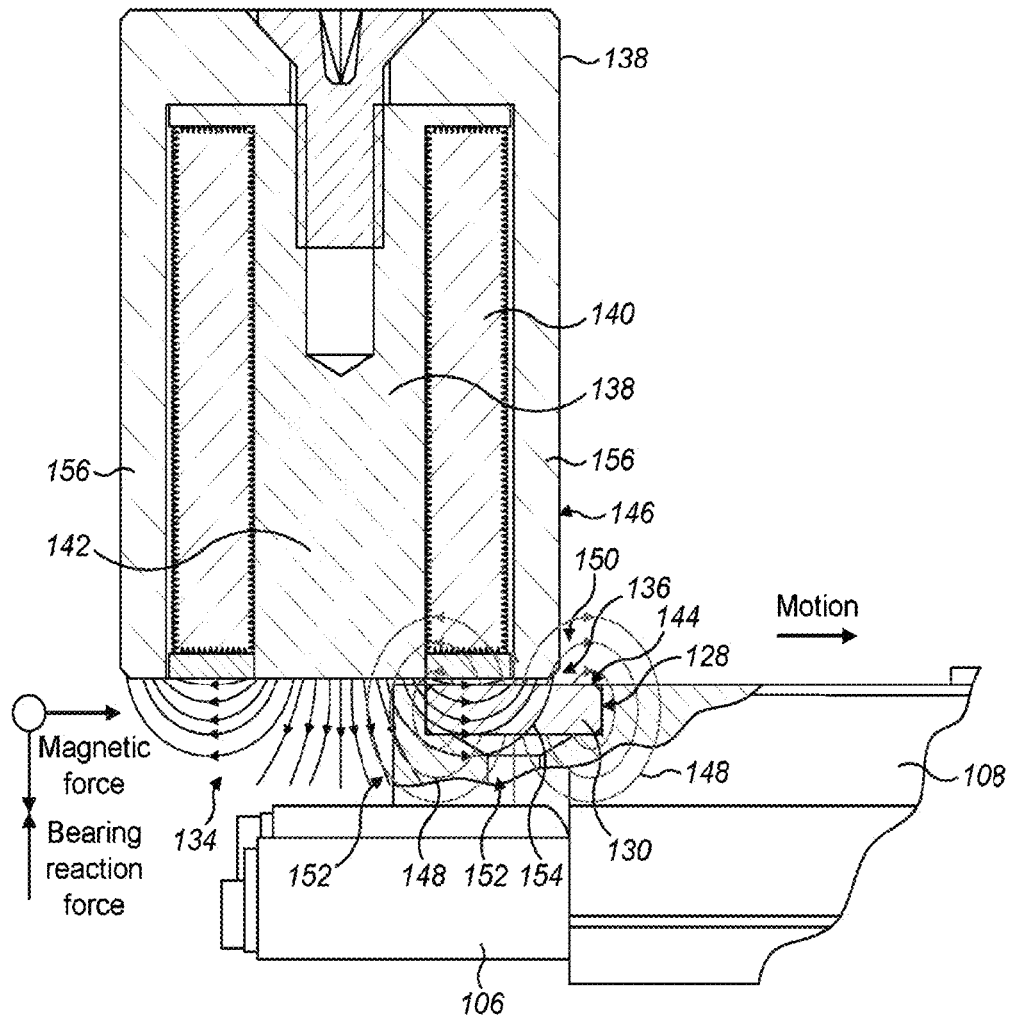
FIG. 2 is a schematic diagram of a region of magnetic coupling of the linear resonance scanning apparatus of FIG. 1 in greater detail.

Turning to FIG. 2, the permanent magnet 130 has an exposed surface 144 located opposite the field output end 134 of the electromagnet 132 in spaced relation to the field output end 134 of the electromagnet 132 separated by the air gap 136. As such, in this example, the permanent magnet 130 is mechanically decoupled from the electromagnet 132. The permanent magnet 130 is laterally offset with respect to the core 138 so that the core 138 substantially does not overlie the permanent magnet 130 when in a state of rest. In this example, the only overlap between the core 138 and the permanent magnet 130 is of the peripheral portion 146 of the core 138. The permanent magnet 130 is elongate and, in this example, is hyperrectangular in form. The permanent magnet 130 has a notional mid-point along the length thereof and the mid-point has, in this example, a neutral position relative to the field output end 134 between the inner and outer diameters of the coil 140. The neutral position is the position about which the permanent magnet reciprocates when in use. The permanent magnet 130 produces first field lines 148 corresponding to a north pole 150 at the exposed surface 144 and a south pole 152 at an opposite side of the permanent magnet 130 located within the recess 128.

Referring back to FIG. 1, a driving circuit 131 is operably coupled to the coil 140 of the electromagnet 132. In this example, the driving circuit 131 is operably coupled to a processing resource, for example a controller, such as a microcontroller 133. Referring to FIG. 2, when energised, the electromagnet 132 produces second field lines 154 extending away from the central leg 142 of the electromagnet 132 towards peripheral legs 156 of the peripheral portion 146 of the core 138 mentioned above. In this regard, the central leg 142 at the field output end 134 of the electromagnet 132 corresponds to a north pole and the peripheral legs 156 at the field output end 134 of the electromagnet 132 correspond to a south pole of the electromagnet 132. However, it will be appreciated from the description hereafter that the second field lines 154 can be fluctuated in strength and frequency of fluctuation in order to influence the permanent magnet 130.

Figure 3:
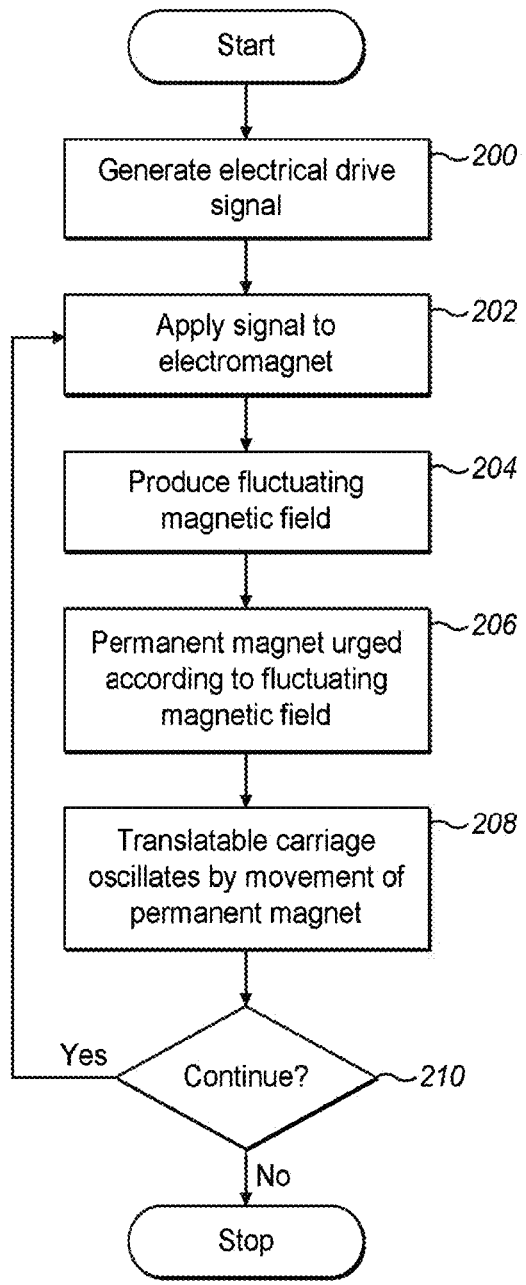
FIG. 3 is a flow diagram of a method of scanning a linearly translatable carriage constituting another embodiment of the invention.

In operation (FIG. 3), a drive signal is generated by the driving circuit 131 (Step 200) under the control of the microcontroller 133, which is applied to the electromagnet 132. Properties of the drive signal are set in order to achieve resonant oscillation of the translatable carriage 108 and hence the scanning lens 112. In this regard, and depending upon the application for the scanning lens 112, the drive signal amplitude and frequency are set accordingly. In this example, the drive signal achieved by applying a half wave signal to an H-bridge electrical circuit that reverses the polarity of a signal applied to the circuit as it reaches zero, thereby providing a sinusoidal output signal. The full-wave frequency of the drive signal is 100 Hz in order to provide a bidirectional scan rate of 200 scans per second. In some examples, the waveform of the drive signal can also be set to have a predetermined waveform, for example a square wave or a sawtooth waveform. In this example, the drive signal is cyclic, for example an alternating signal, such as a substantially sinusoidal signal. The drive signal can be a half-wave signal, for example comprising positive half-cycles of a cyclic waveform, i.e. the parts of the waveform above a mid-point amplitude of the waveform. In other examples, the half-wave signal can comprise negative half-cycles of a waveform, i.e. the parts of the waveform below a mid-point amplitude of the waveform.

The permanent magnet 130 naturally produces a first magnetic field having the first field lines 148. The electrical drive signal is applied (Step 202) to an input (not shown) of the electromagnet 132, which causes the electromagnet 132 to produce (Step 204) a second fluctuating magnetic field having the second field lines 154 at the field output end 134 extending towards the permanent magnet 130. In this regard, the manner of fluctuation, for example amplitude and/or frequency, of the second magnetic field is defined by the drive signal applied to the electromagnet 132. In this example, the permanent magnet 130 is located relative to the electromagnet 132 so as to be side-coupled with the magnetic field generated the electromagnet 132. Such side-coupling, or offset coupling, facilitates the use of smaller sized permanent magnets as opposed to larger diametrically magnetised magnets that would have to be sufficiently large so as to bridge the gap between poles of the electromagnet 132. The fluctuation of the second magnetic field induces motion (Step 206) in the permanent magnet 130 and therefore urges the permanent magnet 130 in a linear direction. The translatable carriage 108 thus undergoes oscillatory motion (Step 208) with the permanent magnet 130 by virtue of the permanent magnet 130 being physically coupled to the translatable carriage 108, the presence of the springs 122, 126 and the fluctuating second magnetic field. Owing to the coupling of the translatable carriage 108 to the linear motion bearing assembly 106, the permanent magnet 130 and thus the translatable carriage 108 are constrained to move linearly in the axis of travel mentioned above and defined by the linear motion bearing assembly 106. In this example, the linear motion bearing assembly 106 constrains movement of the permanent magnet 130 in a plane substantially perpendicular to the longitudinal core axis mentioned above.

The translatable carriage 108 carrying the scanning lens 112 constitutes a mass, and in combination with the first and second springs 122, 126 and friction and compliance of the system constitutes a so-called Mass, Spring, Damper (MSD) system, which oscillates when excited, in particular in this example by the electromagnet 132. In this regard, the frequency of the drive signal is set such that the system, in particular the translatable carriage 108, oscillates with maximum amplitude, i.e. at a natural or resonant frequency, which is predetermined, for example as defined by the physical parameters of the spring or springs and/or the linear motion bearing assembly 106. The resonant oscillation continues until the drive signal to the electromagnet is changed or removed (Step 210). During oscillation, the linear encoder 104 and the encoder scale 110 serve to provide position feedback of the translatable carriage 108 of the linear motion bearing assembly 106 to the microcontroller 133, thereby enabling the position of the translatable carriage 108 to be determined relative to a maximum range of translation. By monitoring the position of the translatable carriage 108 relative to the maximum range of translation, the microcontroller 133 can adjust the amplitude and/or the frequency of the drive signal in response to the position feedback, thereby ensuring that the translatable carriage 108 reciprocates within a range of extension that ensures correct maintenance of the resonant frequency. In the above example, the linear resonance apparatus 100 is sufficiently stable so as not to require the use of closed loop feedback during normal operation to maintain accuracy of the oscillations of the translatable carriage 108. Instead, an initial tuning of the linear resonance apparatus 100 is performed, for example during the process of manufacturing the apparatus 100.

In this regard, to tune the apparatus 100, the apparatus 100 is powered up and the drive signal is set to excite the MSD system at maximum amplitude close to but below the intended frequency of oscillation of the translatable carriage 108, for example about 5 Hz below the intended frequency. The frequency of the drive signal is then adjusted in order to increment the frequency of translation of the translatable carriage 108 and the scan range of the translatable carriage 108 is monitored by way of the linear encoder 104. As the system approaches the resonant frequency, the scan range achieved using the drive signal approaches the maximum achievable scan range. The frequency is then kept constant and the amplitude of the drive signal can then be reduced such that the scan range being consistently achieved is about 10% greater than the desired scan range. This allows for any small variations in system performance and ensures the desired scan range required is always achieved. The microcontroller 133 then stores this frequency and amplitude for future driving of the electromagnet 132 until retuned again, if required.

Retuning can optionally be performed each time the apparatus 100 is powered up or periodically, for example by monitoring the maximum scan range being achieved and retuning once the maximum scan range deviates by a predetermined margin. However, it should also be appreciated that closed-loop control can be employed should tuning and/or retuning be undesirable.

Figure 4:
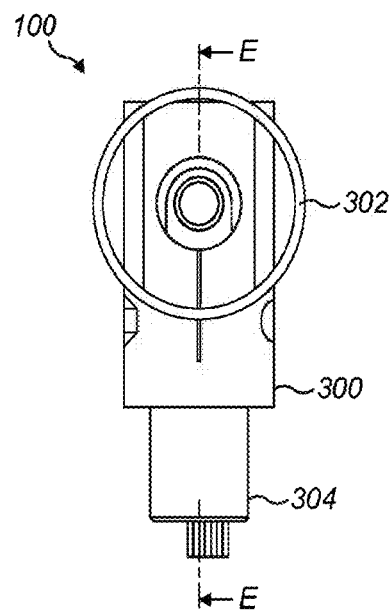
FIG. 4 is a schematic end elevation of another linear resonance scanning apparatus constituting another embodiment of the invention.

Referring to FIG. 4, in another embodiment, the linear resonance scanning apparatus 100 comprises a longitudinally extending housing 300 having a window 302 and an electric motor, for example a brushless Direct Current (DC) motor 304, constituting an electromagnetic drive unit. The brushless DC motor 304 has an axis of rotation and arranged so that the axis of rotation lies substantially transverse to the length of the longitudinally extending housing 300. It should be appreciated that the above-mentioned housing 300 and window 302 can be provided for the previous examples described above in relation to FIGS. 1 to 3.

Figure 5:
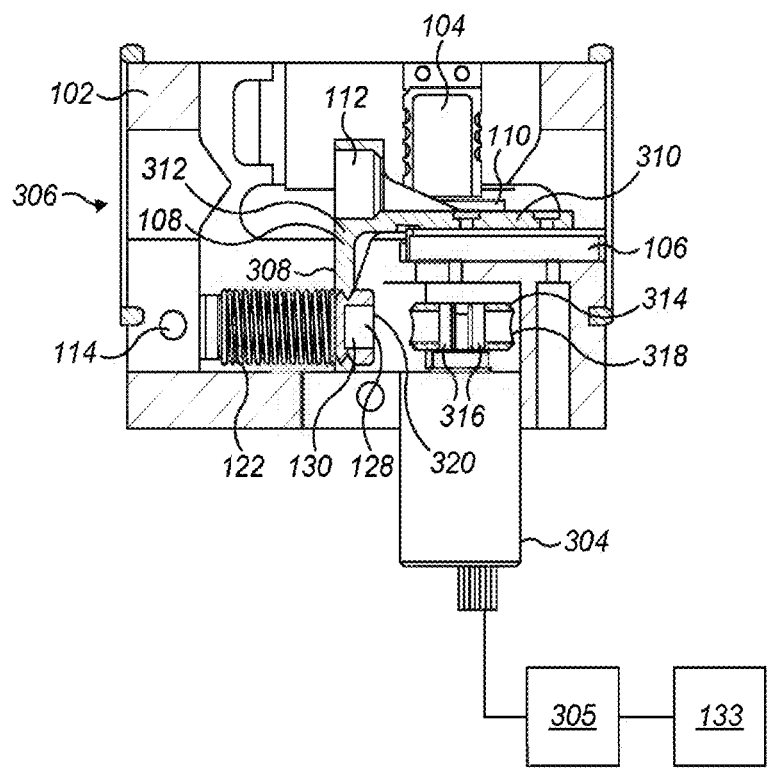
FIG. 5 is schematic cross-section viewed along the line E-E of the apparatus of FIG. 4.

Turning to FIG. 5, in common with the previous embodiment, the linear resonance scanning apparatus 100 comprises the chassis 102, the linear encoder 104 being attached to a first side of the chassis 102. The linear motion bearing assembly 106 is again mounted on the chassis 102 in a generally central location relative to the chassis 102, the linear motion bearing assembly 106 carrying, in this example, a translatable carriage 108. The translatable carriage 108 carries the encoder scale 110, which faces opposite the linear encoder 104. The combination of the linear encoder 104 and the encoder scale 108 is, for example, of the type described in UK patent no. GB 2 467 340. The translatable carriage 108 is configured to cooperate with the linear motion bearing assembly 106 in order to support linear translation of the translatable carriage 108. Furthermore, the translatable carriage 108 is capable of reciprocating or bidirectional travel along a longitudinal axis of reciprocating motion constituting an axis of travel constrained by the linear motion bearing assembly 106. The translatable carriage 108 is configured to carry the lens, for example the scanning lens 112. It should, however, be appreciated that the scanning lens 112 is only one example of an element that can be carried by the translatable carriage 108 and different elements, for example optical elements, such as a mirror or mirror assembly, are contemplated.

In this example, the chassis 102 comprises the first anchoring point 114 at a first side 306 thereof, the first anchoring point 114 being coupled to the first end of the first buffer, for example the first spring 122. A second end of the first spring 122 is disposed against and fixed to an abutment surface 308 of the translatable carriage 108. In this regard, the translatable carriage 108 comprises a longitudinal portion 310 that carries the encoder scale 110 and a transverse portion 312 at one end of the longitudinal portion 310 nearest the first side 306. The transverse portion 310 comprises the recess 128 in one side thereof, and the abutment surface 308 on a second side thereof opposite the second end of the first spring 122. As in the previous embodiment, the permanent magnet 130, for example the neodymium magnet, is fixedly carried by the translatable carriage 108 of the linear motion bearing assembly 106 and is located within the recess 128. It should be appreciated that the first spring 122 serves as a buffer that, when in use, causes the translatable carriage 108 to rebound off the spring depending upon the direction of travel of the translatable carriage 108. In this regard, the first spring 122 buffers motion along the longitudinal axis of reciprocating motion.

The brushless DC motor 304 is operably coupled to a motor driver circuit 305, constituting an electrical drive circuit, the motor driver circuit 305 being operably coupled to the processing resource, for example the controller, such as the microcontroller 133. The brushless DC motor 340 has a rotatable drive shaft (not shown) defining the axis of rotation described above in relation to FIG. 4, the drive shaft extending into a housing of the brushless DC motor 304 and having an exposed portion extending beyond the housing of the brushless DC motor 304 and coupled to a carriage wheel 314, constituting a carriage element. The carriage wheel 314 is rotatably mounted on the brushless DC motor 304 by the rotatable drive shaft. The carriage wheel 314 has a radius, circumference and a width, the width of the carriage wheel 314 defining an outwardly facing peripheral surface 318 at a periphery of the carriage wheel 314. The carriage wheel 314 is configured to carry a plurality of permanent magnets 316, for example two permanent magnets constituting first and second permanent magnets, spaced equidistantly about the peripheral surface 318 of the carriage wheel 314. In this example, the permanent magnets 316 are spaced circumferentially equidistantly about the periphery of the carriage wheel 314. However, the skilled person will appreciate that a greater number of permanent magnets can be employed but need to be arranged about the carriage wheel 314 so as to balance the rotor and prevent vibration.

In this example, each of the two permanent magnets comprise a respective outwardly facing surface at which a respective magnetic pole is produced, each outwardly facing surface, in this example, being substantially parallel with the outwardly facing peripheral surface 318. The respective poles produced at the outwardly facing surfaces of the two permanent magnets are like poles. However, in another example the poles produced at the respective outwardly facing surfaces of the two permanent magnets can be different and therefore alternate in polarity about the circumference of the carriage wheel 314.

The carriage wheel 314 is configured to rotate by virtue of being coupled to the drive shaft of the brushless DC motor 304, one side of the side surface 318 being located opposite the permanent magnet 130 (constituting a third permanent magnet). In this regard, a side surface 320 of the permanent magnet 130 exposed to the peripheral surface 318 at the one side of the carriage wheel 314 produces field lines corresponding to a magnetic pole, which thus faces the peripheral surface 318.

In operation, rotation of the carriage wheel 314 serves to rotate the respective outwardly facing surfaces of the two permanent magnets and thereby present alternating magnetic poles to the exposed side surface 320 of the permanent magnet 130. This therefore causes an alternation of application of attractive or repulsive forces between the carriage wheel 314 and the permanent magnet 130. By virtue of the permanent magnet 130 being attached to the translatable carriage 108, the permanent magnet 130 has freedom to move linearly to a degree defined by the linear motion bearing assembly 106. As such, the continuously alternating magnetic field presented to the permanent magnet 130 causes the translatable carriage 108 to oscillate to and fro.

Figure 6:
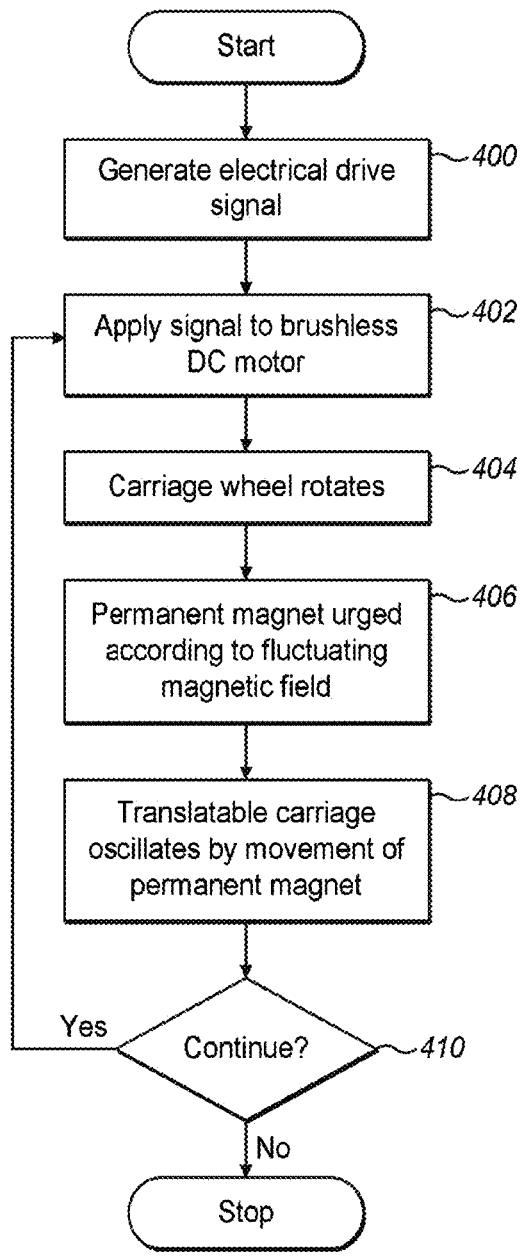
FIG. 6 is a flow diagram of another method of scanning a linearly translatable carriage constituting a further embodiment of the invention.

Turning to FIG. 6, as in this example an electric motor is being driven as opposed to an electromagnet, a different drive signal is therefore generated by the motor drive circuit 305 (Step 400), which is applied to the brushless DC motor 304 under the control of the microprocessor 133. Properties of the drive signal are set in order to achieve resonant oscillation of the translatable carriage 108 and hence the scanning lens 112. In this regard, and depending upon the application for the scanning lens 112, the drive signal amplitude, for example a voltage amplitude, is set accordingly, which determines the speed of rotation of the drive axis and hence the carriage wheel 314. The side surface 320 of the permanent magnet 130 opposite the carriage wheel 314 naturally produces a first magnetic field corresponding to a first pole. The drive signal is applied (Step 402) to the DC brushless motor 304, which causes the drive shaft of the brushless DC motor 304 to rotate and thus the carriage wheel 314 to rotate (Step 404). Rotation of the carriage wheel 314 causes the outwardly facing magnetic poles of the two permanent magnets to alternately face the permanent magnet 130 at a rate dependent upon the speed of rotation of the carriage wheel 314. This results in the permanent magnet 130 being presented with a fluctuating magnetic field, the fluctuation of the magnetic field thereby imparting epochs of alternating magnetic force on the permanent magnet 130 and thus induce motion (Step 406) in the permanent magnet 130. In this example, the pole presented at the side surface 320 of the permanent magnet 130 and the poles presented at the second outwardly facing surfaces of the two permanent magnets 316 carried by the carriage wheel 314 are the same, resulting in repulsive forces being generated between each of the two permanent magnets 316 and the permanent magnet 130 when located opposite each other.

In response to the application of the forces between the oppositely disposed permanent magnets 316, 130, the translatable carriage 108 undergoes oscillatory motion (Step 408) with the permanent magnet 130 by virtue of the permanent magnet 130 being physically coupled to the translatable carriage 108. Owing to the coupling of the translatable carriage 108 to the linear motion bearing assembly 106, the translatable carriage 108 is constrained to move linearly in the axis of travel mentioned above and defined by the linear motion bearing assembly 106.

In this example, the translatable carriage 108 carrying the scanning lens 112 constitutes a mass, and in combination with the first spring 122 and friction and compliance of the system, constitutes another MSD system, which oscillates when excited, in particular in this example by the rotating carriage wheel 314. In this regard, the amplitude of the drive signal is set such that the system, in particular the translatable carriage 108, oscillates with maximum amplitude, i.e. at a natural or resonant frequency, which is predetermined, for example as defined by the physical parameters of the spring and/or the linear motion bearing assembly 106. The resonant oscillation continues until the drive signal to the electromagnet is changed or removed (Step 410). During oscillation, the linear encoder 104 and the encoder scale 110 serve to provide position feedback of the translatable carriage 108 of the linear motion bearing assembly 106 to the microcontroller 133, thereby enabling the position of the translatable carriage 108 relative to a maximum range of translation to be determined. By monitoring the position of the translatable carriage 108 relative to the maximum range of translation, the microcontroller 133 can adjust the drive signal, for example the amplitude thereof, in response to the position feedback, thereby ensuring that the translatable stage 108 reciprocates within a range of extension that ensures correct maintenance of the resonant frequency.

The skilled person should appreciate that the above-described implementations are merely examples of the various implementations that are conceivable within the scope of the appended claims. Indeed, it should be appreciated that although the examples set forth herein describe the translatable carriage 108 carrying a lens 112, it should, however, be appreciated that the scanning lens 112 is only one example of an element that can be carried by the translatable carriage 108 and different elements, for example optical elements, such as a lens assembly or a mirror or mirror assembly, are contemplated.

The invention claimed is:

1. A linear resonance scanning apparatus comprising:
   an electromagnetic drive unit comprising a coil wound about a core, the electromagnetic drive unit having a field output end; and
   a linear motion bearing assembly configured to carry a permanent magnet, the linear motion bearing assembly having a longitudinal axis of reciprocating motion; and
   a biasing element disposed adjacent an end of the linear motion bearing assembly to serve as a buffer for motion along the longitudinal axis of reciprocating motion; wherein
   the permanent magnet has a surface located opposite the field output end of the electromagnetic drive unit in spaced relation to the field output end of the electromagnetic drive unit; and
   the permanent magnet is laterally offset with respect to the core so that the core substantially does not overlie the permanent magnet when at rest.

2. The apparatus according to claim 1, wherein the core has a longitudinal core axis, the linear motion bearing assembly constraining, when in use, the movement of the permanent magnet in a plane substantially perpendicular to the longitudinal core axis.

3. The apparatus according to claim 1, wherein the permanent magnet is mechanically decoupled from the electromagnetic drive unit.

4. The apparatus according to claim 1, wherein the linear motion bearing assembly fixedly carries the permanent magnet.

5. The apparatus according to claim 1, further comprising:
   another biasing element disposed adjacent another end of the linear motion bearing assembly to cooperate with the biasing element as the buffer for motion along the longitudinal axis of reciprocating motion.

6. The apparatus according to claim 1, wherein the linear motion bearing assembly in combination with the biasing element constitute a mass, spring and damper system, the linear motion bearing assembly and/or the biasing element being configured to define a predetermined resonant frequency.

7. The apparatus according to claim 1, wherein the linear motion bearing assembly is configured to carry a lens.

8. The apparatus according to claim 1, wherein the electromagnetic drive unit is configured to generate a fluctuating magnetic field at the field output end thereof, thereby urging the permanent magnet in a linear direction constrained by the linear motion bearing assembly.

9. The apparatus according to claim 1, further comprising:
   a driving circuit operably coupled to the electromagnetic drive unit; wherein
   the driving circuit is configured to generate, when in use, a cyclic output drive signal.

10. The apparatus according to claim 9, wherein the driving circuit is configured to generate a half-wave signal as the cyclic output drive signal.

11. The apparatus according to claim 10, wherein the half-wave signal comprises positive half-cycles of a cyclic waveform.

12. The apparatus according to claim 9, further comprising:
    a linear position encoder unit configured to provide position feedback with respect to the linear motion bearing assembly; and
    a processing resource operably coupled to the driving circuit and the linear position encoder unit and configured to detect a maximum range of translation drive, and to adjust a frequency of the cyclic output drive signal in response to the position feedback.

13. The apparatus according to claim 1, wherein the core is an E-shaped core having a central leg and a peripheral core portion, the coil being wound about the central leg.

14. An optical measurement apparatus comprising a linear resonance scanning apparatus, the linear resonance scanning apparatus comprising:
    an electromagnetic drive unit comprising a coil wound about a core, the electromagnetic drive unit having a field output end; and
    a linear motion bearing assembly configured to carry a permanent magnet, the linear motion bearing assembly having a longitudinal axis of reciprocating motion; and
    a biasing element disposed adjacent an end of the linear motion bearing assembly to serve as a buffer for motion along the longitudinal axis of reciprocating motion; wherein
    the permanent magnet has a surface located opposite the field output end of the electromagnetic drive unit in spaced relation to the field output end of the electromagnetic drive unit; and
    the permanent magnet is laterally offset with respect to the core so that the core substantially does not overlie the permanent magnet when at rest.

15. A method of scanning a linear motion bearing assembly comprising a permanent magnet, the method comprising:
    disposing a field output end of an electromagnetic drive unit opposite the permanent magnet and in spaced relation to the field output end of the electromagnetic drive unit;
    providing a biasing element adjacent an end of the linear motion bearing assembly to serve as a buffer for motion along a longitudinal axis of the linear motion bearing assembly;

arranging the permanent magnet so as to be offset from core of the electromagnetic drive unit when in a state of rest;

reciprocating the linear motion bearing assembly by applying an electrically induced fluctuating magnetic field from the field output end of the electromagnet and extending towards the permanent magnet.

\* \* \* \* \*